(12) United States Patent
Fukumoto

(10) Patent No.: US 11,810,452 B2
(45) Date of Patent: Nov. 7, 2023

(54) NOTIFYING DEVICE AND NOTIFYING SYSTEM

(71) Applicant: PANASONIC INTELLECTUAL PROPERTY MANAGEMENT CO., LTD., Osaka (JP)

(72) Inventor: Satoshi Fukumoto, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 166 days.

(21) Appl. No.: 17/212,572

(22) Filed: Mar. 25, 2021

(65) Prior Publication Data

US 2021/0206314 A1 Jul. 8, 2021

Related U.S. Application Data

(63) Continuation of application No. 16/348,959, filed as application No. PCT/JP2017/040731 on Nov. 13, 2017, now Pat. No. 10,988,078.

(30) Foreign Application Priority Data

Nov. 18, 2016 (JP) .................................. 2016-225351

(51) Int. Cl.
  *B60Q 1/28* (2006.01)
  *G08G 1/005* (2006.01)
  (Continued)

(52) U.S. Cl.
  CPC ............. *G08G 1/005* (2013.01); *B60Q 1/507* (2022.05); *B60Q 1/547* (2022.05); *B60R 21/34* (2013.01); *G08G 1/16* (2013.01); *B60Q 2400/50* (2013.01)

(58) Field of Classification Search
  CPC ...... B60Q 1/50; B60Q 2400/50; B60Q 1/547; B60Q 1/507; B60Q 1/444; B60Q 1/54;
  (Continued)

(56) References Cited

U.S. PATENT DOCUMENTS

| | | |
|---|---|---|
| 7,095,336 B2 | 8/2006 | Rodgers |
| 7,576,639 B2 | 8/2009 | Boyles |

(Continued)

FOREIGN PATENT DOCUMENTS

| | | |
|---|---|---|
| DE | 102006041857 A1 | 4/2007 |
| DE | 102012024494 A1 | 6/2014 |

(Continued)

OTHER PUBLICATIONS

German Office Action dated Jun. 22, 2022 for the related German Patent Application No. 112017005834.1.

(Continued)

*Primary Examiner* — Toan N Pham
(74) *Attorney, Agent, or Firm* — GREENBLUM & BERNSTEIN, P.L.C.

(57) ABSTRACT

A notifying method includes detecting an object existing in a periphery of a vehicle and determining a type of the object existing in the periphery of the vehicle. The notifying method further includes emitting a visible light to irradiate at least a part of the periphery of the vehicle with an irradiation pattern. The irradiation pattern includes an icon pattern indicating the type of the object.

10 Claims, 15 Drawing Sheets

(51) Int. Cl.
*G08G 1/16* (2006.01)
*B60R 21/34* (2011.01)
*B60Q 1/50* (2006.01)

(58) Field of Classification Search
CPC .......... B60R 21/34; G08G 1/16; G08G 1/005; G08G 1/166
See application file for complete search history.

(56) References Cited

U.S. PATENT DOCUMENTS

| | | | |
|---|---|---|---|
| 7,782,184 B2 * | 8/2010 | Wittorf | B60Q 1/50 340/463 |
| 7,876,203 B2 | 1/2011 | Traylor | |
| 9,744,901 B2 | 8/2017 | Goto | |
| 9,785,042 B2 * | 10/2017 | Fujita | G03B 21/26 |
| 10,457,199 B2 | 10/2019 | Kunii | |
| 10,528,827 B2 | 1/2020 | Kozuka | |
| 11,066,009 B2 * | 7/2021 | Tatara | B60Q 1/52 |
| 2006/0119473 A1 | 6/2006 | Gunderson | |
| 2007/0102214 A1 | 5/2007 | Wittorf et al. | |
| 2011/0068910 A1 | 3/2011 | Iwai | |
| 2014/0062685 A1 | 3/2014 | Tamatsu | |
| 2015/0258928 A1 | 9/2015 | Goto et al. | |
| 2015/0336502 A1 | 11/2015 | Hillis et al. | |
| 2017/0253177 A1 * | 9/2017 | Kawamata | B60K 35/00 |
| 2017/0259728 A1 * | 9/2017 | Nagata | B60Q 9/006 |

FOREIGN PATENT DOCUMENTS

| | | | | |
|---|---|---|---|---|
| DE | 102015011212 A1 | | 3/2016 | |
| JP | 2011-084106 | | 4/2011 | |
| JP | 2013086663 A | * | 5/2013 | ............ B60Q 1/085 |
| JP | 2014-013524 | | 1/2014 | |
| JP | 2014-046838 | | 3/2014 | |
| JP | 2015-174541 | | 10/2015 | |
| JP | 2015-186944 | | 10/2015 | |
| JP | 2016-049890 | | 4/2016 | |
| JP | 2017165178 A | * | 9/2017 | |
| WO | WO-2016035118 A1 | * | 3/2016 | ............... B60Q 1/50 |
| WO | WO-2016163294 A1 | * | 10/2016 | ......... B60K 31/0008 |

OTHER PUBLICATIONS

International Search Report of PCT application No. PCT/JP2017/040731 dated Jan. 30, 2018.

* cited by examiner

NOTIFYING DEVICE AND NOTIFYING SYSTEM

CROSS-REFERENCE TO RELATED APPLICATIONS

This application is a Continuation of U.S. patent application Ser. No. 16/348,959, filed on May 10, 2019, now U.S. Pat. No. 10,988,078, which is a U.S. National Phase under 35 U.S.C. § 371 of International Application No. PCT/JP2017/040731, filed on Nov. 15, 2017, which in turn claims the benefit of Japanese Application No. 2016-225351, filed on Nov. 18, 2016. The disclosure of each of these documents, including the specification, drawings, and claims, is incorporated herein by reference in its entirety.

TECHNICAL FIELD

The present disclosure relates to a notifying device, an automatic driving vehicle, a notifying method, a program, a non-transitory recording medium, and a notifying system.

BACKGROUND ART

In recent years, with development of computer technologies and the like, development of an automatic driving vehicle in which a part or the whole of drive operations by a human are performed by computer technologies in place of the human has been progressed. The automatic driving vehicle recognizes situations around a vehicle detected by an in-vehicle sensor, such as an in-vehicle camera or a light detection and ranging, laser imaging detection and ranging (LiDAR) device, by an in-vehicle computer and performs drive operations in accordance with the recognized situations.

On the other hand, it is difficult for a pedestrian (hereinafter, referred to as a person around a vehicle) around an automatic driving vehicle to predict a behavior of the automatic driving vehicle by checking a line of sight or the like of a passenger of the automatic driving vehicle. Therefore, a situation in which a person around the vehicle cannot predict the behavior of the automatic driving vehicle and thus feels anxiety is assumed.

There is proposed a technology that frees a person around the vehicle from anxiety due to unpredictability of the behavior of the automatic driving vehicle. For example, Patent Literature 1 discloses a method in which an in-vehicle sensor detects a person around the vehicle, and a motor controller causes a casing of a movable device with a light source or the like to perform pan action and tilt action toward the person around the vehicle.

CITATION LIST

Patent Literature

PTL 1: Unexamined Japanese Patent Publication No. 2015-174541

SUMMARY OF THE INVENTION

In a configuration described in Patent Literature 1, the motor controller causes a casing of a movable device to perform pan action and tilt action toward the person around the vehicle. Therefore, for example, when only one movable device is provided, the movable device cannot be directed toward two or more persons around the vehicle.

An object of the present disclosure is to provide a notifying device, an automatic driving vehicle, a notifying method, a program, a non-transitory recording medium, and a notifying system which enable a plurality of pedestrians to confirm that an automatic driving vehicle recognizes persons around the vehicle.

The notifying device of the present disclosure is a notifying device mounted in the vehicle and includes a controller and a light emitter. The controller determines, based on a detection result of a plurality of objects existing in a periphery of the vehicle, directions of notification objects included in the plurality of objects with the vehicle as a reference. The light emitter emits light in the directions of the notification objects.

The automatic driving vehicle of the present disclosure includes a detection device, the notifying device, and a vehicle control device. The detection device detects a plurality of objects existing in a periphery of the automatic driving vehicle and outputs a detection result to the notifying device and the vehicle control device. The vehicle control device outputs a predetermined control signal that controls operations of the automatic driving vehicle based on the detection result of the detection device.

The notifying method of the present disclosure includes the steps of determining, based on a detection result of a plurality of objects existing in a periphery of the vehicle, directions of notification objects included in the plurality of objects with the vehicle as a reference, and emitting light in the directions of the notification objects.

The program of the present disclosure causes a computer provided in a notifying device to execute the processing of determining, based on a detection result of a plurality of objects existing in a periphery of a vehicle, directions of notification objects included in the plurality of objects with the vehicle as a reference; and causing a light emitter to emit light in the directions of the notification objects.

The non-transitory recording medium of the present disclosure is a non-transitory recording medium recording a computer-readable program. The computer-readable program causes a computer provided in a notifying device to execute the steps of determining, based on a detection result of a plurality of objects existing in a periphery of a vehicle, directions of notification objects included in the plurality of objects with the vehicle as a reference; and causing a light emitter to emit light in the directions of the notification objects.

The notifying system of the present disclosure includes a detection device and a notifying device. The detection device detects a plurality of objects existing in a periphery of the vehicle and outputs a detection result to the notifying device. The notifying device includes a controller and a light emitter. The controller determines, based on a detection result of the detection device, directions of notification objects included in the plurality of objects. The light emitter emits light in the directions of the notification objects.

DESCRIPTION OF EMBODIMENTS

Hereinafter, exemplary embodiments of the present disclosure will be described in detail with reference to the drawings.

First Exemplary Embodiment

Figure 1A:
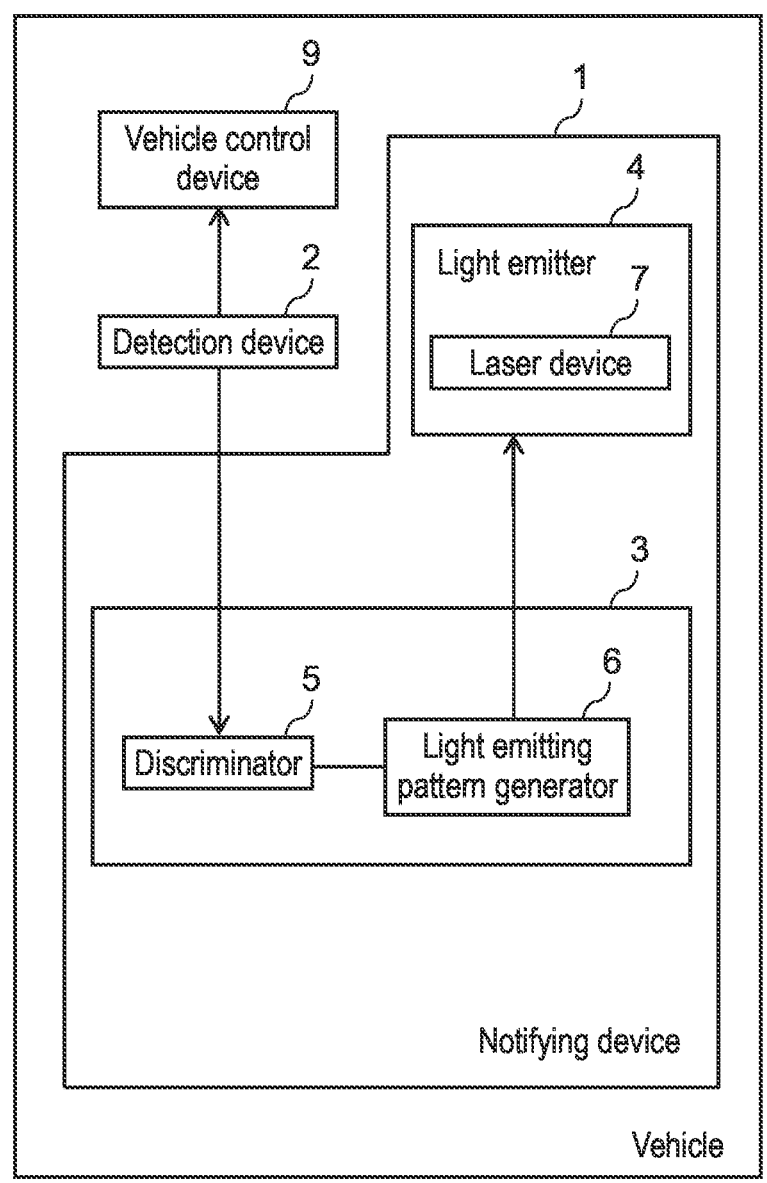
FIG. 1A is a configuration diagram of a vehicle including a notifying device according to a first exemplary embodiment of the present disclosure.
Figure 1B:
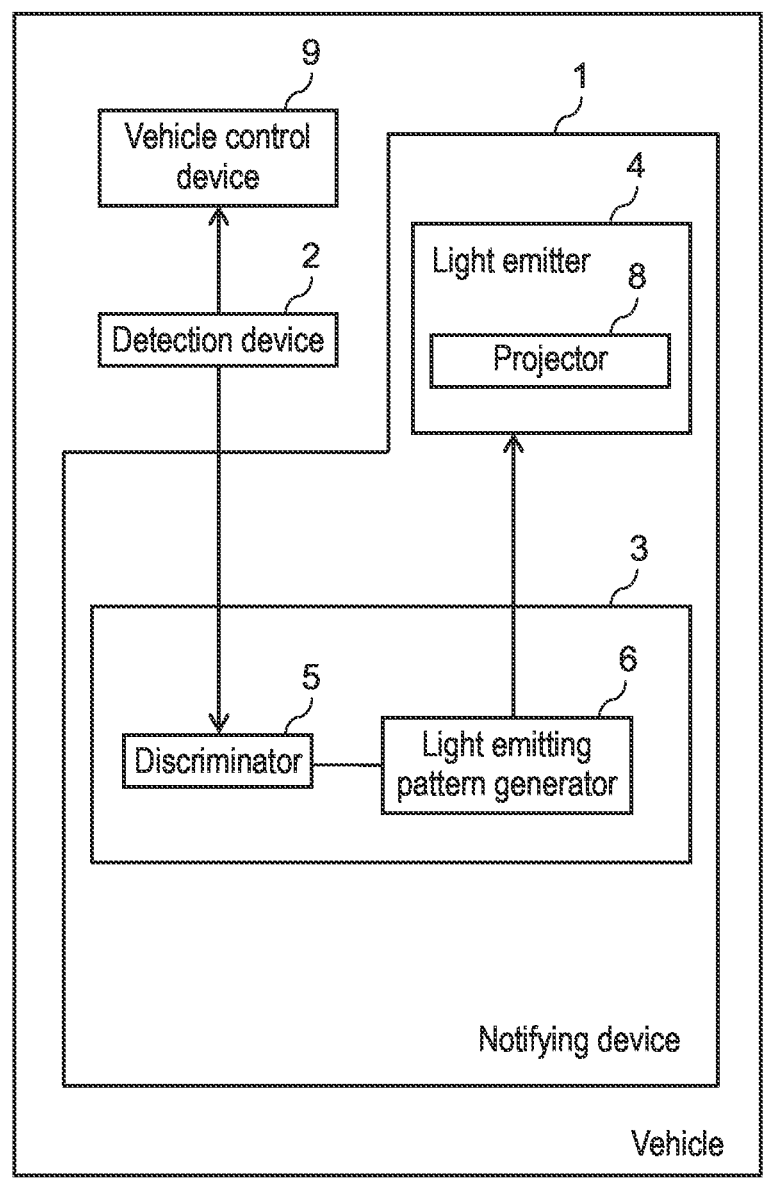
FIG. 1B is another configuration diagram of the vehicle including the notifying device according to the first exemplary embodiment of the present disclosure.

FIGS. 1A and 1B are each a configuration diagram of an automatic driving vehicle including notifying device 1 according to a first exemplary embodiment of the present disclosure. A notifying system includes detection device 2 and notifying device 1. Notifying device 1 is mounted in a vehicle and has controller 3 and light emitter 4. Detection device 2 is connected to notifying device 1. The notifying system may be mounted in a normal vehicle not including vehicle control device 9.

Vehicle control device 9 calculates a rudder angle, a vehicular swept path, and the like based on a detection result output from detection device 2. Then, vehicle control device 9 controls a steering wheel (not shown).

Detection device 2 detects a plurality of objects existing in a periphery of the vehicle. In one example, detection device 2 includes an in-vehicle camera that images a front of the vehicle and an in-vehicle side camera that images right and left sides of the vehicle. For example, detection device 2 is an in-vehicle camera and an in-vehicle side camera used in an electronic mirror system of the vehicle.

Controller 3 has a central processing unit (CPU), a read only memory (ROM), a random access memory CAM), and the like. The CPU, for example, reads a program according to a processing content from the ROM, develops the program in the RAM, and centrally controls operation of each block of controller 3 in conjunction with the developed program. Controller 3 functions as discriminator 5 and light emitting pattern generator 6.

Discriminator 5 discriminates, based on a detection result of detection device 2, a notification object included in a plurality of objects detected by detection device 2 and determines respective directions of the discriminated notification objects. Here, the notification object is an object to be notified of being detected by detection device 2. In one example, the respective directions are based on a center of the vehicle. In one example, when the vehicle is an automatic driving vehicle, discriminator 5 is a discrimination engine that discriminates an object on a road surface around the vehicle in the in-vehicle computer of the automatic driving vehicle. For example, the notification object is a vulnerable road user recognized by the in-vehicle computer of the automatic driving vehicle. Hereinafter, that the in-vehicle computer of the automatic driving vehicle recognizes the vulnerable road user will be simply described that the vehicle recognizes.

In one example, discriminator 5 discriminates a type of the notification object. The type of the notification object is, for example, a vulnerable road user such as a pedestrian, a bicycle, or a wheelchair on the road. Means for discriminating the notification object is, for example, a support vector machine (SVM) that has learned notification objects in advance or a neural network.

Light emitting pattern generator 6 generates data indicating a light emitting pattern of light emitter 4. In one example, the light emitting pattern is an irradiation pattern including a sectorial area with a center of the vehicle as a reference. In another example, the light emitting pattern is an irradiation pattern including an icon. In still another example, the light emitting pattern is an irradiation pattern including an image showing a route (assumed route) on which the vehicle advances from now.

Light emitter 4 emits light in the respective directions of the recognized notification objects, based on the data indicating the light emitting pattern generated by light emitting pattern generator 6. In one example, light emitter 4 has laser device 7 that emits a laser beam. In addition, as illustrated in FIG. 1B, in another example, light emitter 4 has projector 8, such as a liquid crystal projector or a DLP projector. In these cases, the light emitting pattern is an irradiation pattern irradiated onto the road surface around the vehicle.

Figure 2:
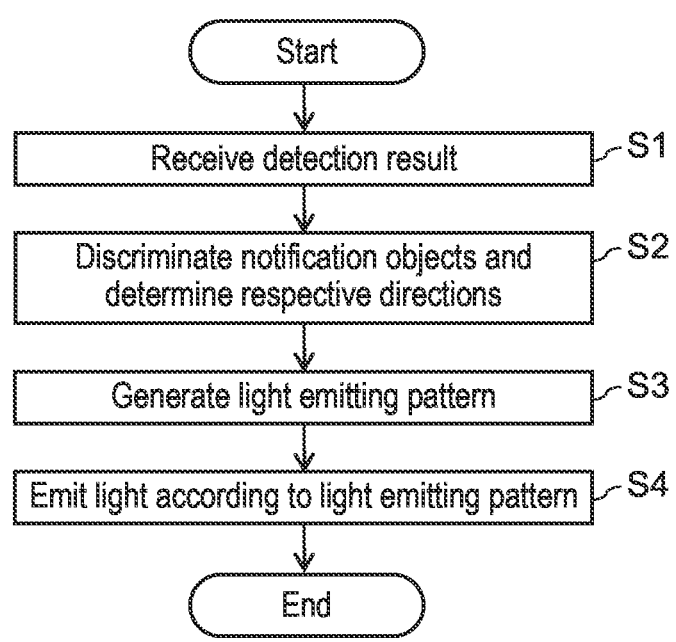
FIG. 2 is a flowchart illustrating an operation example of a notifying device according to an exemplary embodiment of the present disclosure.

FIG. 2 is a flowchart illustrating an operation example of notifying device 1. This processing is realized by the CPU of notifying device 1 reading, in response to, for example, the start of a vehicle engine, the program stored in the ROM and executing the program.

Detection device 2 detects a plurality of objects existing in a periphery of the vehicle. Notifying device 1 receives a detection result from detection device 2 (S1). In one example, detection device 2 detects a plurality of objects when an in-vehicle camera that images a front of the vehicle and an in-vehicle side camera that images right and left sides of the vehicle image the plurality of objects.

Controller 3 discriminates, based on a detection result of detection device 2, notification objects and determines respective directions of the discriminated notification objects (S2) (processing as discriminator 5).

Controller 3 generates data indicating a light emitting pattern (S) (processing as light emitting pattern generator 6). In one example, light emitting pattern generator 6 generates, for notification objects discriminated by discriminator 5, data indicating an irradiation pattern including sectorial areas spreading in the respective directions of the notification objects. In another example, light emitting pattern generator 6 generates data indicating an irradiation pattern including an icon that indicates a type of a notification object discriminated by discriminator 5. In still another example, light emitting pattern generator 6 generates data indicating an irradiation pattern including an image showing a route on which the vehicle advances acquired from an automatic driving system of the vehicle.

In one example, detection device 2 is an in-vehicle camera. Discriminator 5 can extract a white band-shaped object existing between the notification objects and the vehicle, based on the image captured by the in-vehicle camera. The white band-shaped object is, for example, a pedestrian crossing, a line indicating a lane division, or the like. In this case, light emitting pattern generator 6 selects the white band-shaped object as a position onto which light emitter 4 irradiates the irradiation pattern. In another example, when discriminator 5 can extract a white band-shaped object with reference to a three-dimensional road surface map, light emitting pattern generator 6 selects the white band-shaped object as a position onto which light emitter 4 irradiates the irradiation pattern. In this way, the notification object can more easily confirm the icon or the like irradiated onto the road surface.

In one example, when detection device 2 can measure a distance to the notification object, light emitting pattern generator 6 determines the position onto which the icon is irradiated according to the measured distance.

A limit value of the distance to the notification object that can be measured by detection device 2 is referred to as a measurement limit distance. The limit value of the distance in which light emitter 4 can irradiate light is referred to as an irradiation limit distance. When the measurement limit distance is larger than the irradiation limit distance, the distance to the notification object measured by detection device 2 sometimes becomes larger than the irradiation limit distance. In this case, light emitting pattern generator 6 determines, for example, a position closer from the center of the vehicle by a predetermined distance with respect to the irradiation limit distance in the direction of the notification object, as a position onto which the icon is irradiated.

In contrast, when the distance to the notification object measured by detection device 2 is smaller than the irradiation limit distance, light emitting pattern generator 6 determines, for example, a position closer by a predetermined distance with respect to the measured distance to the notification object in the direction of the notification object, as a position on a road surface onto which the icon is irradiated. In this way, the notification object can more easily confirm the irradiated icon or the like.

Light emitter 4 emits light according to the data indicating a light emitting pattern generated by light emitting pattern generator 6 (S4). In one example, when light emitter 4 is laser device 7 or projector 8, light emitter 4 irradiates an image showing a sectorial area, an icon, and an assumed route generated by light emitting pattern generator 6 onto a road surface around the vehicle.

Figure 3:
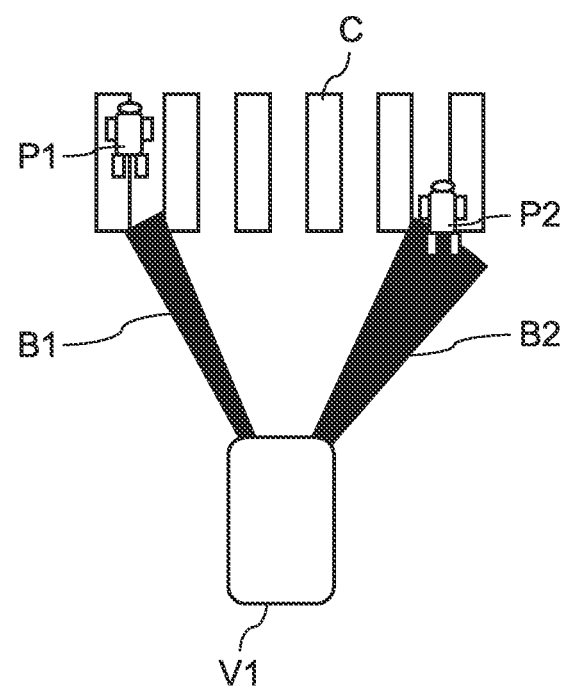
FIG. 3 is a diagram illustrating one example of notification of the notifying device according to the first exemplary embodiment of the present disclosure.

FIG. 3 is a diagram illustrating one example of notification of notifying device 1. As illustrated in FIG. 3, vehicle V1 is stopped before pedestrian crossing C. Pedestrians P1 and P2 are crossing pedestrian crossing C.

In this case, notifying device 1 irradiates light to irradiation area B1 on the road surface in the direction of pedestrian P1, and irradiates light to irradiation area B2 on the road surface in the direction of pedestrian P2. In one example, irradiation areas B1, B2 are each a sectorial area with a center of vehicle V1 as a reference. The color of irradiated light is, for example, green indicating "GO" of a traffic signal. In one example, a central angle of a sector is determined according to the distance from the vehicle to the notification object. For example, the shorter the distance from the vehicle to the notification object is, the larger central angle is determined. With the movement of pedestrians P1, P2, light emitting pattern generator 6 of notifying device 1 moves irradiation areas B1, B2 and generates data indicating a light emitting pattern so that irradiation areas B1, B2 are always directed in the directions where pedestrians P1, P2 exist, respectively.

Pedestrian P1 can confirm that vehicle V1 recognizes pedestrian P1, by viewing light irradiated to irradiation area B1. This allows pedestrian P1 to cross pedestrian crossing C with an easy mind. Pedestrian P2 can also confirm that vehicle V1 recognizes pedestrian P2, by viewing light irradiated to irradiation area B2. This allows pedestrian P2 to cross pedestrian crossing C with an easy mind. Even when a plurality of notification objects cross pedestrian crossing C, irradiating the irradiation areas individually on the road surface for each notification object allows each notification object to confirm that vehicle V1 recognizes the notification object.

Figure 4:
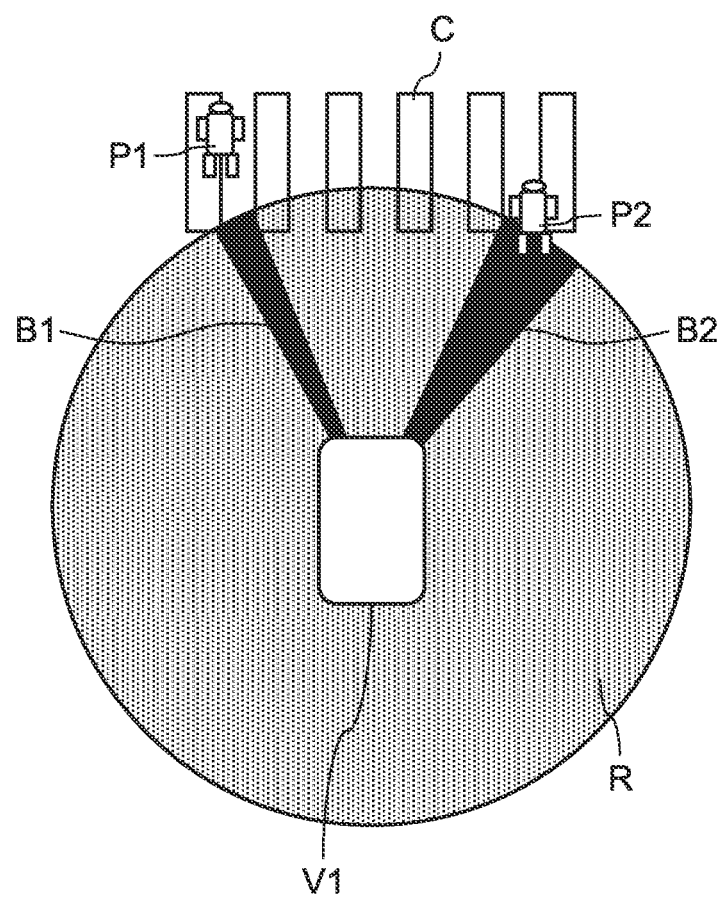
FIG. 4 is a diagram illustrating another example of notification of the notifying device according to the first exemplary embodiment of the present disclosure.

FIG. 4 is a diagram illustrating another example of notification of notifying device 1. The example in FIG. 4 is different from that illustrated in FIG. 3 in that notifying device 1 irradiates light of a color (for example, red) different from a color of light irradiated to irradiation areas B1, B2 to an inside of circle R with a center of vehicle V1 as a reference other than irradiation areas B1, B2. Here, a radius of circle R is, in one example, determined according to a speed of vehicle V1. For example, controller 3 obtains a distance in which vehicle V1 can slow down and stop by braking based on a speed of moving vehicle V1. With this, the radius of circle R is determined to be the minimum value of the distance from the center of vehicle V1 in which moving vehicle V1 can slow down by braking and stop. In this way, the notification object that crosses pedestrian crossing C can confirm the distance in which vehicle V1 slows down by braking and stops. Therefore, the notification object can cross pedestrian crossing C with an easier mind.

Figure 5:
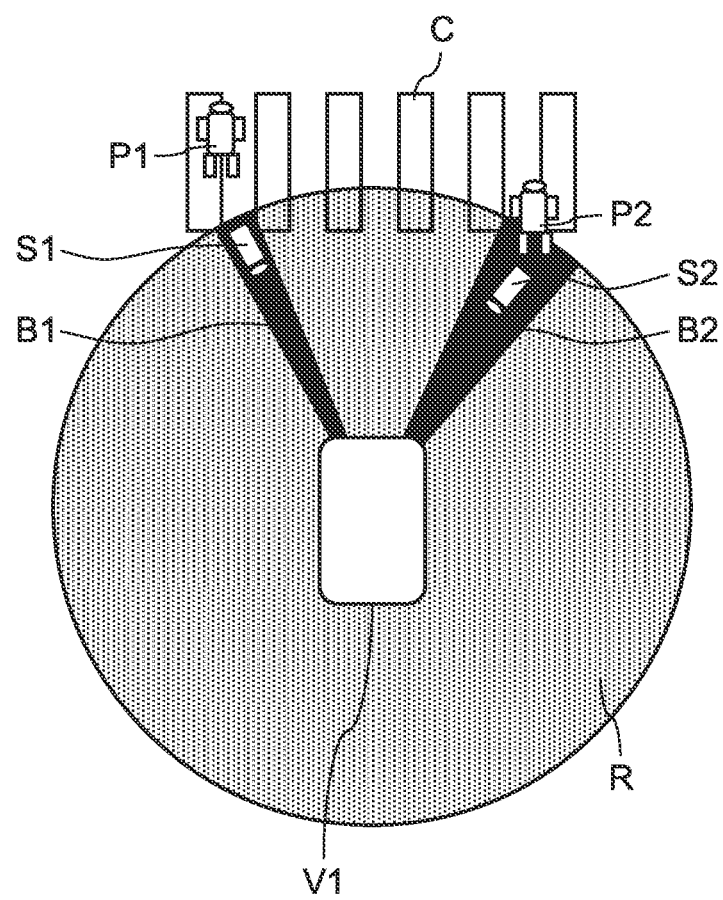
FIG. 5 is a diagram illustrating still another example of notification of the notifying device according to the first exemplary embodiment of the present disclosure.

FIG. 5 is a diagram illustrating still another example of notification of notifying device 1. The example in FIG. 5 is different from that illustrated in FIG. 4 in that the notifying device irradiates icons S1, S2 indicating types of discriminated notification objects to an inside of irradiation areas B1, B2, respectively. Each of icons S1, S2 shows a pedestrian that is a type of a notification object. In this way, the notification object can confirm more surely that vehicle V1 recognizes the notification object. Therefore, the notification object can cross pedestrian crossing C with an easier mind.

Figure 6:
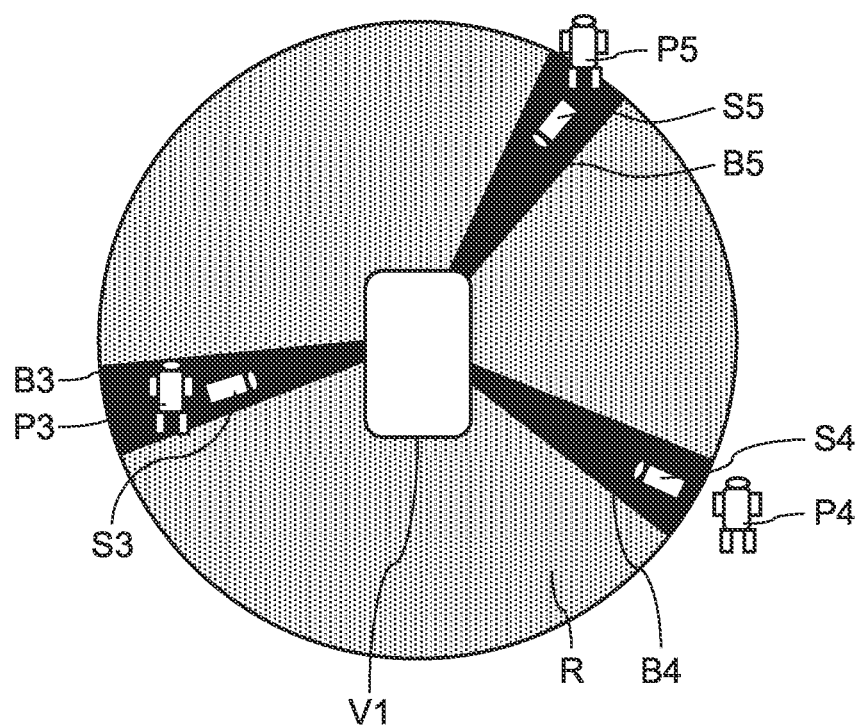
FIG. 6 is a diagram illustrating a different example of notification of the notifying device according to the first exemplary embodiment of the present disclosure.

FIG. 6 is a diagram illustrating a different example of notification of notifying device 1. The example in FIG. 6 is different from that illustrated in FIG. 5 in that notifying device 1 irradiates light to an irradiation area for a notification object existing on a road surface other than the pedestrian crossing. In one example, notifying device 1 irradiates light to an irradiation area for notification objects existing on a road surface in all directions.

As illustrated in FIG. 6, pedestrians P3, P4, P5 are walking on the road surface other than the pedestrian crossing. The notifying device irradiates irradiation areas B3, B4, B5 on the road surface in the directions of respective pedestrians P3, P4, P5. In one example, the notifying device irradiates icons S3, S4, S5 showing the pedestrians that are types of the discriminated notification objects to an inside of irradiation areas B3, B4, B5, respectively. In this way, for example, a notification object passing by vehicle V1 can confirm that vehicle V1 recognizes the notification object. In addition, even when vehicle V1 turns right or left, a notification object around the vehicle can confirm that vehicle V1 recognizes the notification object.

Figure 7:
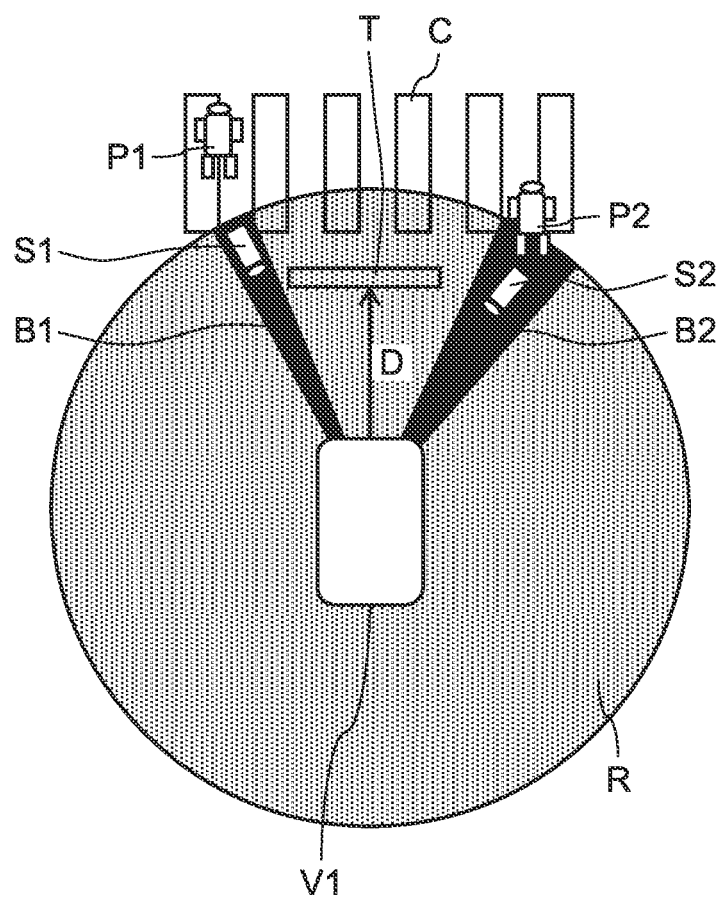
FIG. 7 is a diagram illustrating a still different example of notification of the notifying device according to the first exemplary embodiment of the present disclosure.

FIG. 7 is a diagram illustrating still different example of notification of notifying device 1. The example in FIG. 7 is different from that illustrated in FIG. 5 in that the notifying device irradiates icon T indicating a virtual stop line in front of vehicle V1. In one example, notifying device 1 irradiates, onto the road surface, image D showing an assumed route on which vehicle V1 advances to icon T. In this way, the notification object crossing pedestrian crossing C can confirm that vehicle V1 has no intention to run beyond icon T indicating the virtual stop line. Therefore, the notification object can cross pedestrian crossing C with an easier mind.

Figure 8:
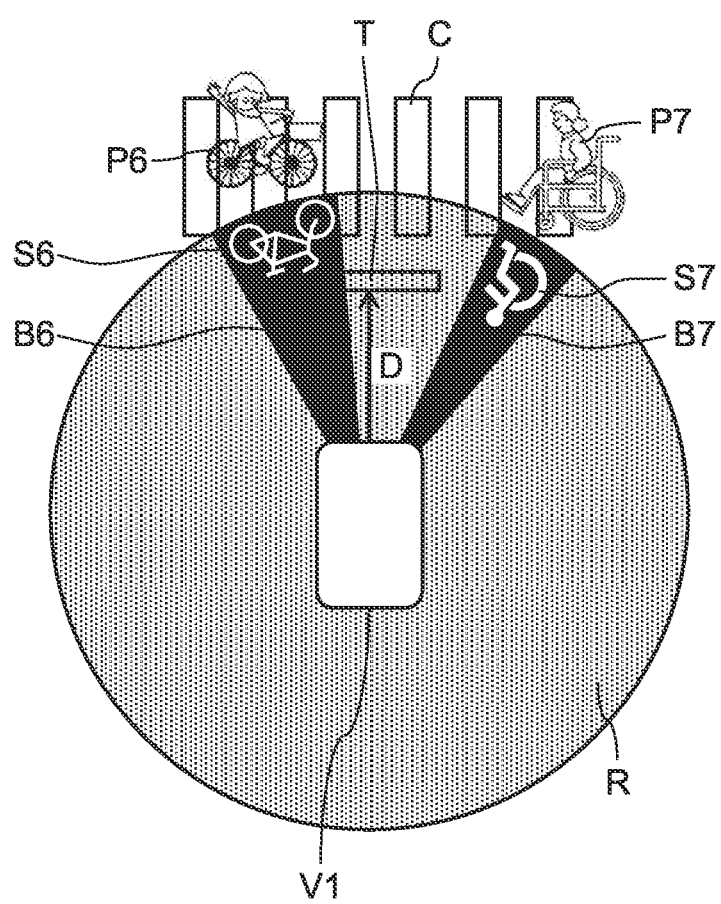
FIG. 8 is a diagram illustrating one more example of notification of the notifying device according to the first exemplary embodiment of the present disclosure.

FIG. 8 is a diagram illustrating one more example of notification of notifying device 1. The example in FIG. 8 is different from that illustrated in FIG. 7 in that notifying device 1 irradiates light to sectorial irradiation area B6 on the road surface in a direction of bicycle P6 crossing pedestrian crossing C and irradiates light to sectorial irradiation area B7 on the road surface in a direction of wheelchair P7 crossing pedestrian crossing C. Further, it is also different from the example illustrated in FIG. 7 in that notifying device 1 irradiates icon S6 indicating a bicycle that is a type of the discriminated notification object in irradiation area B6 and irradiates icon S7 indicating a wheelchair that is a type of the discriminated notification object in irradiation area B7. In this way, a passer crossing pedestrian crossing C riding on a bicycle, a wheelchair, or the like can confirm that vehicle V1 recognizes the passer.

Second Exemplary Embodiment

Figure 9:
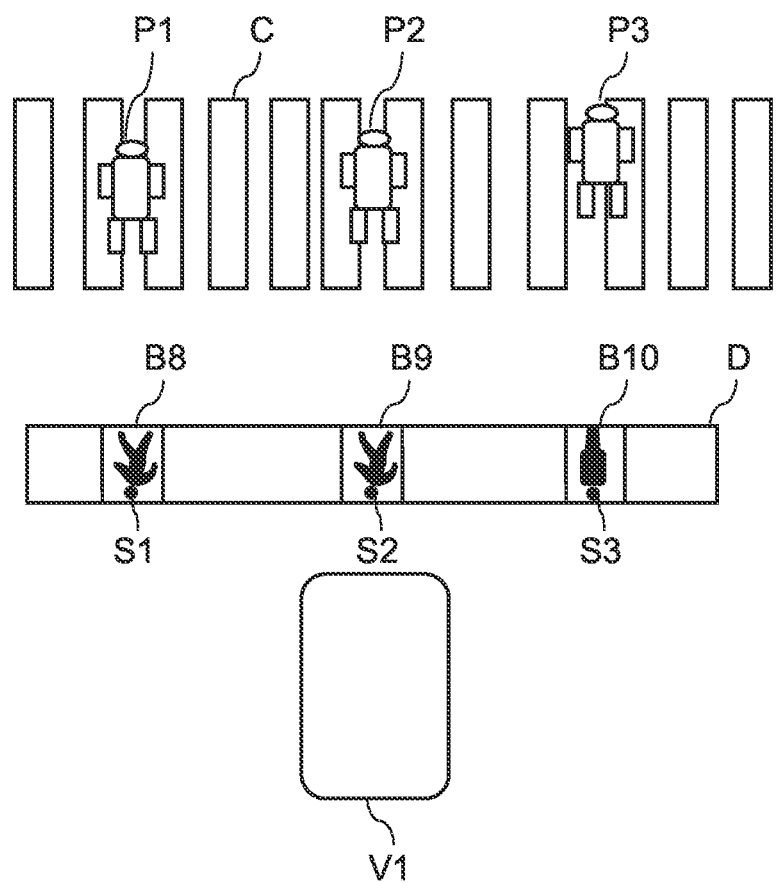
FIG. 9 is a diagram illustrating one example of notification of a notifying device according to a second exemplary embodiment of the present disclosure.

FIG. 9 is a diagram illustrating one example of notification of notifying device 1 according to a second exemplary embodiment of the present disclosure. A basic configuration of notifying device 1 in the present exemplary embodiment is similar to that of FIGS. 1A, and 1B. In the present exemplary embodiment, a light emitting pattern generated by light emitting pattern generator 6 is an irradiation pattern including a band-shaped area based on a distance from a position of vehicle V1 in which moving vehicle V1 can stop by braking. For example, an end portion of the width of the band-shaped area may be positioned at a position where vehicle V1 can stop by braking. In addition, a central portion of the width of the band-shaped area may be positioned at a position where vehicle V1 can stop by braking.

In FIG. 9, the band-shaped area is linear area D. Notifying device 1 irradiates light to irradiation area B8 on the road surface in the direction of pedestrian P1, irradiates light to irradiation area B9 on the road surface in the direction of pedestrian P2, and irradiates light to irradiation area B10 on the road surface in the direction of pedestrian P3. In one example, irradiation areas B8, B9, B10 occupy a part of linear area D. The color of irradiated light is, for example, green indicating "GO" of a traffic signal. Notifying device 1 further irradiates icons S1, S2, S3 indicating types of discriminated notification objects to an inside of irradiation areas B8, B9, B10, respectively.

Notifying device 1 irradiates light of a color (for example, red) different from the color of light irradiated to irradiation areas B8, B9, B10 to a portion other than irradiation areas B8, B9, B10 in linear area D. Here, linear area D is an area substantially vertical to an advancing direction of vehicle V1. "Substantially vertical" is within a range of +10° to −10° with respect to the advancing direction of vehicle V1.

With the movement of pedestrians P1, P2, P3, light emitting pattern generator 6 of notifying device 1 moves irradiation areas B8, B9, B10 and generates data indicating a light emitting pattern so that irradiation areas B8, B9, B10 are always directed in the directions where pedestrians P1, P2, P3 exist, respectively. In this way, the notification object can confirm more surely that vehicle V1 recognizes the notification object. Therefore, the notification object can cross pedestrian crossing C with an easier mind.

Figure 10:
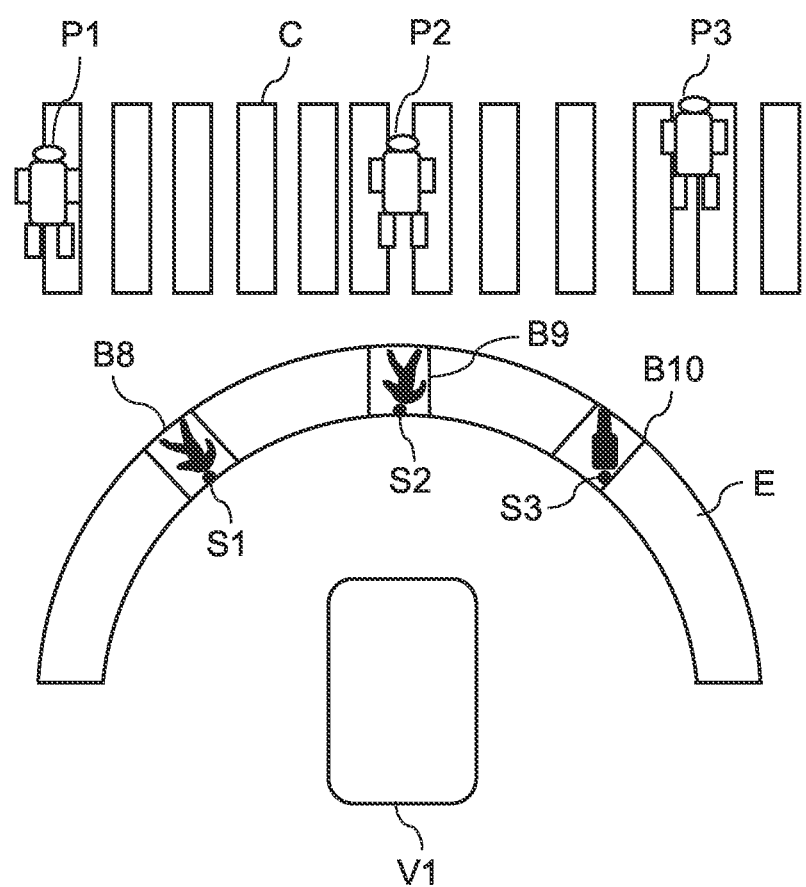
FIG. 10 is a diagram illustrating one example of notification of the notifying device according to the second exemplary embodiment of the present disclosure.

FIG. 10 is a diagram illustrating another example of notification of notifying device 1 according to the present exemplary embodiment. Notifying device 1 irradiates light to irradiation area B8 on the road surface in the direction of pedestrian P1, irradiates light to irradiation area B9 on the road surface in the direction of pedestrian P2, and irradiates light to irradiation area B10 on the road surface in the direction of pedestrian P3. In one example, irradiation areas B8, B9, B10 occupy apart of semi-annular area E. The color of irradiated light is, for example, green indicating "GO" of a traffic signal. Notifying device 1 further irradiates icons S1, S2, S3 indicating types of discriminated notification objects to an inside of irradiation areas B8, B9, B10, respectively.

Notifying device 1 irradiates light of a color (for example, red) different from the color of light irradiated to irradiation areas B8, B9, B10 to semi-annular area E with vehicle V1 as a reference other than irradiation areas B8, B9, B10. Here, semi-annular area E is an area based on the distance from a position of vehicle V1 in which moving vehicle V1 can stop by braking.

With the movement of pedestrians P1, P2, P3, light emitting pattern generator 6 of notifying device 1 moves irradiation areas B8, B9, B10 and generates data indicating a light emitting pattern so that irradiation areas B8, B9, B10 are always directed in the directions where pedestrians P1, P2, P3 exist, respectively. In this way, the notification object can confirm more surely that vehicle V1 recognizes the notification object. Therefore, the notification object can cross pedestrian crossing C with an easier mind.

Figure 11:
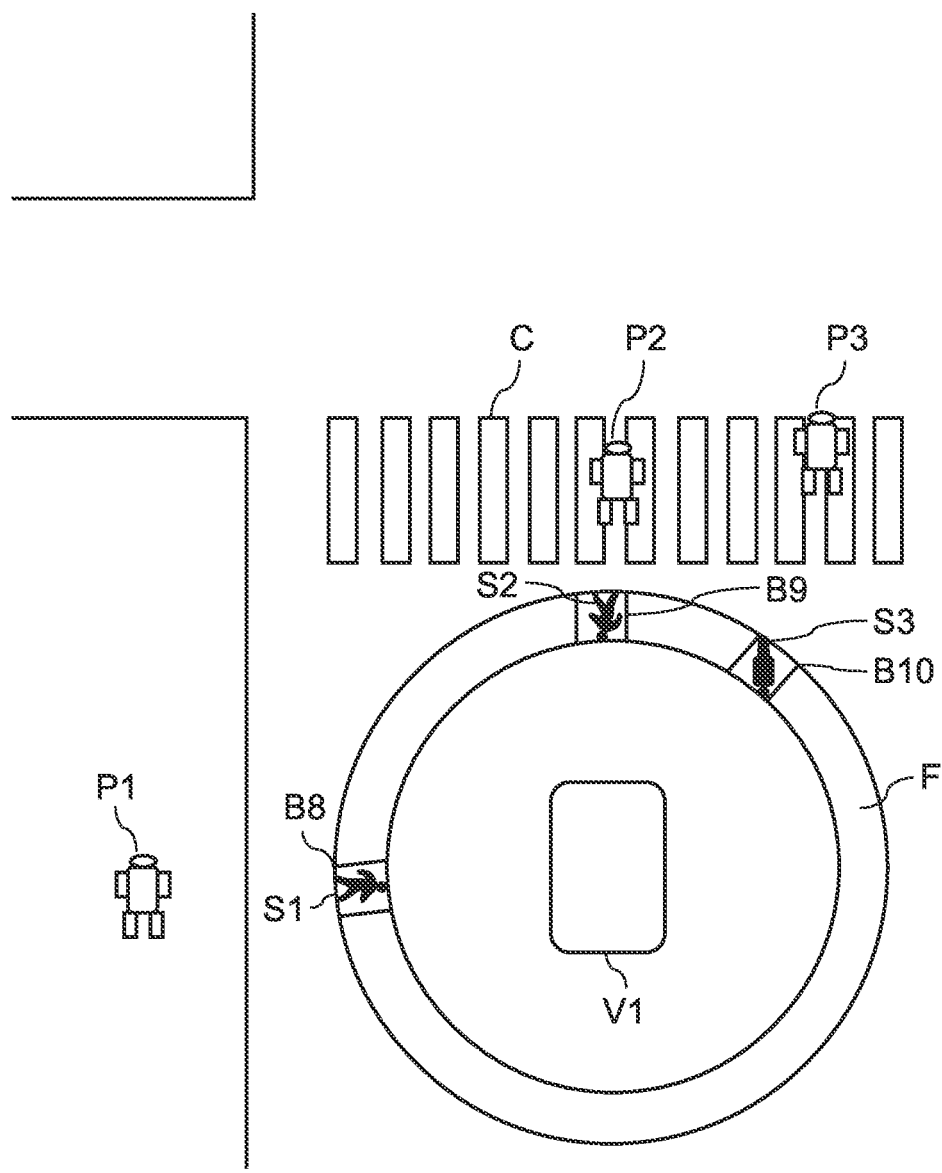
FIG. 11 is a diagram illustrating another example of notification of the notifying device according to the second exemplary embodiment of the present disclosure.

FIG. 11 is a diagram illustrating still another example of notification of notifying device 1 according to the present exemplary embodiment. The example in FIG. 11 is different from that illustrated in FIG. 10 in that notifying device 1 irradiates light of a color (for example, red) different from the color of light irradiated to irradiation areas B8, B9, B10 to annular area F with vehicle V1 as a reference other than irradiation areas B8, B9, B10. In this way, for example, the notification object passing by vehicle V1 can confirm that vehicle V1 recognizes the notification object. In addition, even when vehicle V1 turns right or left, a notification object around the vehicle can confirm that vehicle V1 recognizes the notification object.

Third Exemplary Embodiment

Figure 12:
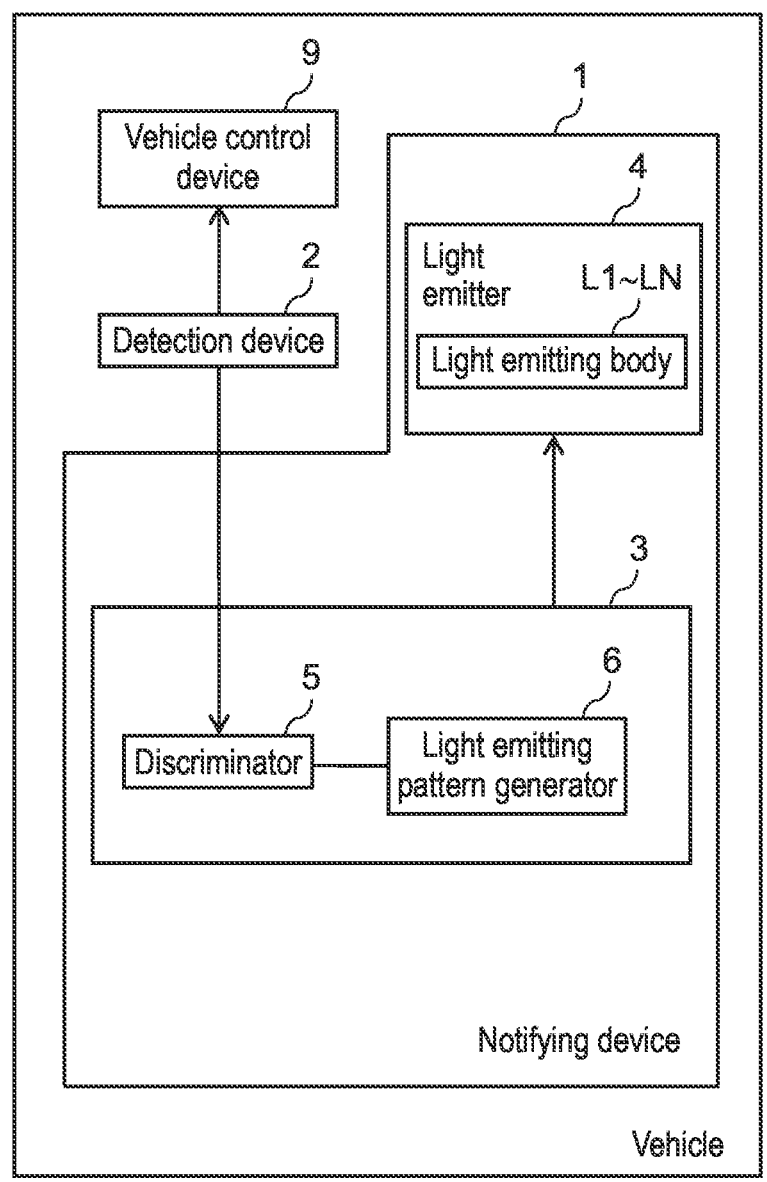
FIG. 12 is a configuration diagram of a vehicle including a notifying device according to a third exemplary embodiment of the present disclosure.

In the following, description is given on a configuration different from the first and second exemplary embodiments, and description on similar configuration is omitted. FIG. 12 is a configuration diagram of a vehicle including a notifying device according to the present exemplary embodiment.

Light emitting pattern generator 6 generates data indicating a light emitting pattern of light emitter 4. Different from the first and second exemplary embodiments, the light emitting pattern generated by light emitting pattern generator 6 is a pattern for turning on or off a plurality of light emitting bodies L1 to LN which are owned by light emitter 4 and arranged on a surface of a vehicle body.

Light emitter 4, different from the first and second exemplary embodiments, has a plurality of light emitting bodies L to LN arranged on a surface of the vehicle. For example, light emitting bodies L1 to LN are light emitting diodes (LEDs). Light emitter 4 emits light in the respective directions of the discriminated notification objects, based on the data indicating the light emitting pattern generated by light emitting pattern generator 6.

With reference to FIG. 2, one operation example of notifying device 1 according to the present exemplary embodiment will be described. Processing from step S1 to step S2 is omitted because the processing is similar to those of the first and second exemplary embodiments.

In S3, controller 3 generates data indicating a light emitting pattern (processing as light emitting pattern generator 6). In the present exemplary embodiment, light emitter 4 has a plurality of light emitting bodies arranged on a surface of the vehicle. In this case, light emitting pattern generator 6 generates data indicating a light emitting pattern so as to turn on two or more light emitting bodies positioned in the respective directions of the notification objects discriminated by discriminator 5 among the plurality of light emitting bodies L1 to LN and turn off the other light emitting bodies.

Light emitter 4 emits light according to the data indicating a light emitting pattern generated by light emitting pattern generator 6 (S4).

Figure 13:
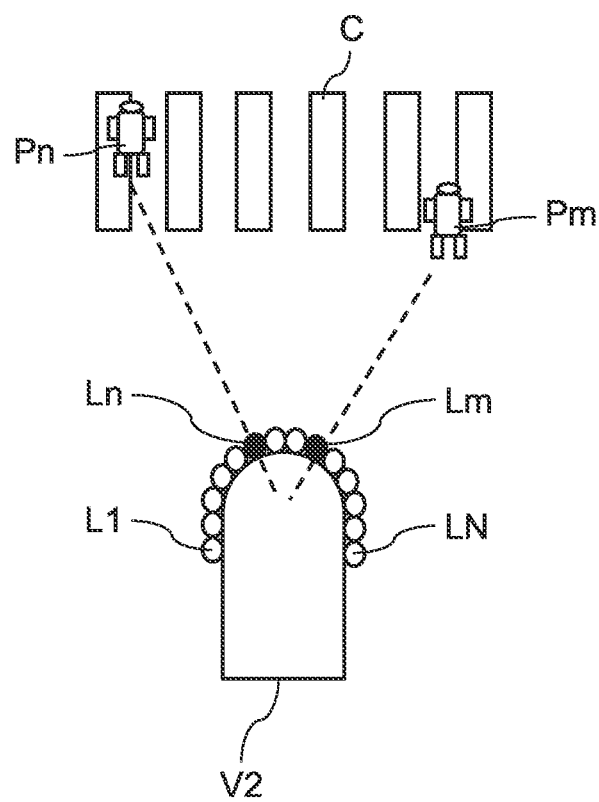
FIG. 13 is a diagram illustrating still another example of notification of the notifying device according to the third exemplary embodiment of the present disclosure.

FIG. 13 is a diagram illustrating one example of notification of notifying device 1 according to the present exemplary embodiment. In the present exemplary embodiment, light emitter 4 has light emitting bodies L1, . . . , Ln, . . . , Lm, . . . , LN. Light emitting bodies L1, . . . , Ln, . . . , Lm, . . . , LN are arranged laterally on a surface (for example, front surface) of a vehicle body of vehicle V2. As illustrated in FIG. 13, vehicle V2 is stopped before pedestrian crossing C. Pedestrians Pn and Pm are crossing pedestrian crossing C.

In this case, notifying device 1 turns on light emitting body Ln positioned in the direction of pedestrian Pn and turns on light emitting body Lm positioned in the direction of pedestrian Pm. The color of light emitted from the light emitting body is, for example, green indicating "GO" of a traffic signal. Notifying device 1 turns off light emitting bodies other than light emitting bodies Ln, Lm. With movement of pedestrians Pn, Pm, notifying device 1 changes light emitting bodies that emit light and always causes light emitting bodies existing in the directions of respective pedestrians Pn, Pm among light emitting bodies L1 to LN to emit light.

Pedestrian Pn can confirm that vehicle V2 recognizes pedestrian Pn, by viewing light emitting body Ln that emits light. This allows pedestrian Pn to cross pedestrian crossing C with an easy mind. Pedestrian Pm can also confirm that vehicle V2 recognizes pedestrian Pm, by viewing light emitting body Lm that emits light. This allows pedestrian Pm to cross pedestrian crossing C with an easy mind. Even when a plurality of notification objects cross pedestrian crossing C, it is possible for each notification object to confirm that vehicle V2 recognizes the notification object, by causing light emitting bodies to individually emit light for each notification object.

In this way, notifying device 1 according to any of the first to third exemplary embodiments has controller 3 and light emitter 4. Controller 3 determines, based on a detection result of a plurality of objects existing in a periphery of the vehicle, respective directions of notification objects included in the plurality of objects with the vehicle as a reference. Light emitter 4 emits light in respective directions.

According to notifying device 1, it is possible for a plurality of pedestrians existing in a periphery of a vehicle to confirm that the (automatic driving) vehicle recognizes the pedestrians, without the need of rotating light emitter 4. This allows a plurality of pedestrians existing in a periphery of the vehicle to be free from anxiety due to the vehicle at the same time.

In addition, according to notifying device 1 according to the first exemplary embodiment, an irradiation pattern can be irradiated onto a road surface near the foot of a pedestrian. Therefore, the notification object can confirm more surely that an automatic driving vehicle recognizes the notification object.

OTHER EXEMPLARY EMBODIMENTS

Detection device 2 of notifying device 1 according to the first to third exemplary embodiments may include an infrared ray sensor. The infrared ray sensor irradiates infrared light and measures a direction of an object existing in a periphery of the vehicle and a distance to the object based on the infrared light reflected and detected. Here, the distance to the object is, for example, a distance defined with a distance from the center of the vehicle to the object as a reference. The direction of the object is defined, for example, with the center of the vehicle as a reference.

In addition, detection device 2 of notifying device 1 according to the first to third exemplary embodiments may be an active sonar. The active sonar irradiates ultrasonic wave and measures a direction of an object existing in a periphery of the vehicle and a distance to the object based on the reflected wave reflected and detected. Note that, in a case where the types as illustrated in FIGS. 5 to 11 and 13 need not be indicated, detection device 2 may be configured with an infrared ray sensor single body or an active sonar single body.

In addition, detection device 2 of notifying device 1 according to the first to third exemplary embodiments may be an appropriate combination of an in-vehicle camera, an infrared ray sensor, and an active sonar. This enables to accurately detect a type, a direction, and a distance of an object.

As illustrated in FIGS. 4 to 8, notifying device 1 according to the first exemplary embodiment irradiates green light to irradiation areas B1 to B6 on the road surface, and irradiates red light to an inside of circle R with a center of vehicle V1 as a reference other than irradiation areas B1 to B6. In place of this, the color of light irradiated by light emitter 4 may be changed according to the color of the road surface or pedestrian crossing extracted by discriminator 5. For example, the color of light irradiated by notifying device 1 is set to a complementary color of the color of the road surface or pedestrian crossing. This allows a pedestrian or the like to visually confirm the irradiated light more clearly.

As illustrated in FIGS. 9 to 11, notifying device 1 according to the second exemplary embodiment irradiates green light to irradiation areas B8 to B10 on the road surface, and irradiates red light to an area based on a distance in which vehicle V1 can stop by braking other than irradiation areas B8 to B10. In place of this, the color of light irradiated by light emitter 4 may be changed according to the color of the road surface or pedestrian crossing extracted by discriminator 5. For example, the color of light irradiated by notifying device 1 is set to a complementary color of the color of the road surface or pedestrian crossing. This allows a pedestrian or the like to visually confirm the irradiated light more clearly.

Notifying device 1 according to the first and second exemplary embodiments irradiates light to irradiation areas B1 to B10 on the road surface. In place of this, notifying device 1 may generate other visual effects, such as hologram, on the road surface and notify a notification object of detection of the notification object. Note that, an example of combination of sector, circle, and icon is not limited to FIGS. 4 to 8. For example, in FIG. 8, combination of not irradiating circle R may be used. Note that, the icons illustrated in FIGS. 5 to 11 are preferably displayed such that the lower side of the icon is directed to the notification object side. For example, in a case where the notification object is a pedestrian, the icon indicates a pedestrian. In this case, a foot part of the pedestrian of the icon is irradiated to the notification object side and a head part of the pedestrian of the icon is irradiated to the vehicle side. This allows the notification object to easily recognize the icon.

Figure 14:
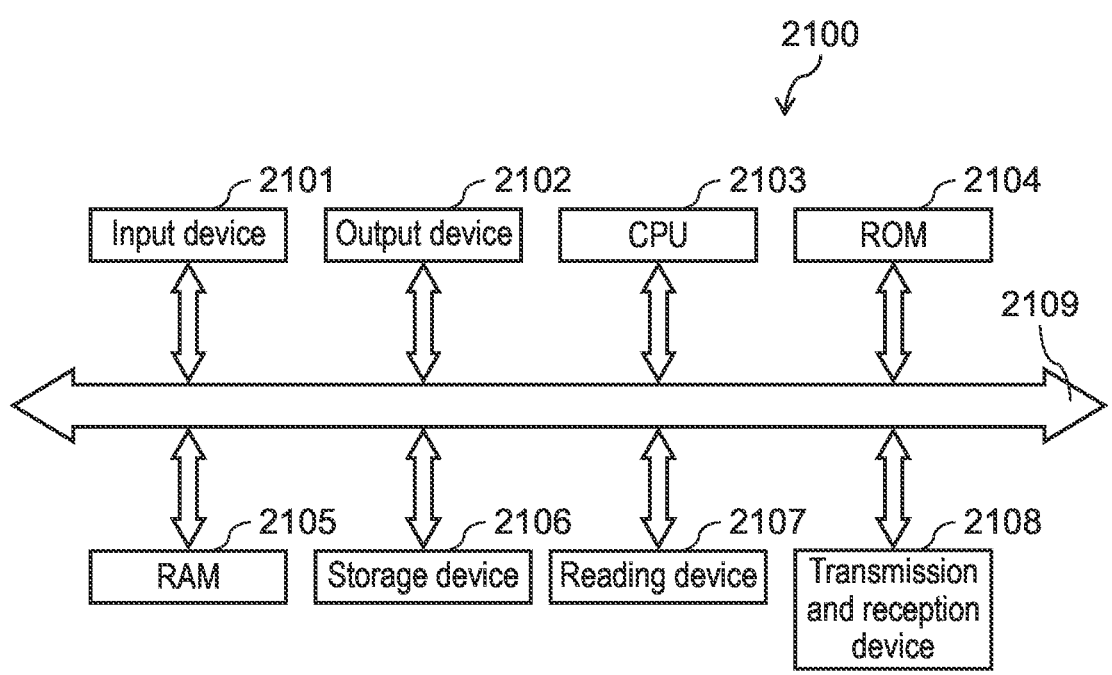
FIG. 14 is a diagram illustrating one example of a hardware configuration of a computer included in the notifying device according to the exemplary embodiments of the present disclosure.

FIG. 14 is a diagram illustrating an example of a hardware configuration of a computer. The function of each part in each of the above-described exemplary embodiments is realized by a program executed by computer 2100.

As illustrated in FIG. 14, computer 2100 includes input device 2101 such as an input button or a touch pad, output device 2102 such as a display or a speaker, CPU 2103, ROM 2104, and RAM 2105. In addition, computer 2100 has storage device 2106 such as a hard disk device or a solid state drive (SSD), reading device 2107 that reads information from a recording medium such as a digital versatile disk read only memory (DVD-ROM) or a universal serial bus (USB) memory, and transmission and reception device 2108 that performs communication via a network. The above-described respective parts are interconnected through bus 2109.

Reading device 2107 reads programs from the recording medium on which the programs for realizing functions of the above-described respective parts are recorded and stores the programs in storage device 2106. Alternatively, transmission and reception device 2108 communicates with a server device connected to the network and stores, in storage device 2106, programs for realizing functions of the above-described respective parts which are downloaded from the server device.

Then, CPU 2103 copies the program stored in storage device 2106 to RAM 2105, sequentially reads commands included in the program from RAM 2105 and executes the read commands. Thereby, the functions of the above-described respective parts are realized. When the program is executed, information obtained by the various processing described in each exemplary embodiment is stored in RAM 2105 or storage device 2106 and used appropriately.

INDUSTRIAL APPLICABILITY

The notifying device according to the present disclosure is preferably applied to a vehicle including the automatic driving system.

REFERENCE MARKS IN THE DRAWINGS 1 notifying device
2 detection device
3 controller
4 light emitter
discriminator
6 light emitting pattern generator
7 laser device
8 projector
2100 computer
2101 input device
2102 output device
2103 CPU
2104 ROM
2105 RAM
2106 storage device
2107 reading device
2108 transmission and reception device
2109 bus

The invention claimed is:

1. A notifying method comprising:
   detecting an object existing in a periphery of a vehicle;
   determining a type of the object; and
   emitting a visible light to irradiate at least a part of the periphery of the vehicle with an irradiation pattern,
   wherein the irradiation pattern includes an icon pattern indicating the type of the object, and
   the irradiation pattern further includes a pattern having a band-shaped area, and the icon pattern indicating the type of the object is irradiated inside the band-shaped area.

2. The notifying method according to claim 1, wherein the irradiation pattern further includes a sectorial area pattern spreading toward the object.

3. The notifying method according to claim 1, wherein the determining includes determining the type of the object from a plurality of types of objects including at least one of a pedestrian type, a bicycle type, and a wheelchair type.

4. The notifying method according to claim 1, wherein the irradiation pattern further includes a circular pattern having a radius determined based on a distance the vehicle moves before the vehicle stops by performing a braking operation.

5. The notifying method according to claim 1, wherein the irradiation pattern further includes an icon pattern indicating a virtual stop line irradiated in front of the vehicle.

6. The notifying method according to claim 1, wherein the irradiation pattern further includes an image pattern showing a route on which the vehicle advances to a virtual stop line.

7. The notifying method according to claim 1, wherein
   in a case where the object is a pedestrian, the icon pattern of a pedestrian type is irradiated on a road surface in a direction of the pedestrian by a projector provided on a side of a vehicle body, the icon pattern of the pedestrian type being irradiated between the pedestrian and the vehicle.

8. The notifying method according to claim 1, wherein
   in a case where the object is a pedestrian, the icon pattern of a pedestrian type is irradiated on a road surface in a direction of the pedestrian with reference to the vehicle.

9. The notifying method according to claim 1, wherein
   in a case where the object is a pedestrian, the icon pattern indicating a pedestrian is irradiated on a road surface such that a head part of the pedestrian of the icon pattern is on a vehicle side and a lower part of the pedestrian of the icon pattern is on an object side.

10. A notifying method comprising:
detecting an object existing in a periphery of a vehicle;
determining a type of the object; and
emitting a visible light to irradiate at least a part of the periphery of the vehicle with an irradiation pattern,
wherein the irradiation pattern includes an icon pattern indicating the type of the object, and
in a case where the object is a pedestrian, the icon pattern indicating a pedestrian is irradiated on a road surface such that a head part of the pedestrian of the icon pattern is on a vehicle side and a lower part of the pedestrian of the icon pattern is on an object side.

* * * * *